(12) United States Patent
Brett et al.

(10) Patent No.: US 9,339,931 B2
(45) Date of Patent: May 17, 2016

(54) METHOD AND APPARATUS FOR LOCATING A PICKUP POINT FOR AN OBJECT IN AN INSTALLATION

(75) Inventors: Wolfgang Brett, Kehl (DE); Eric Bürkle, Schutterwald (DE)

(73) Assignee: PRIMETALS TECHNOLOGIES AUSTRIA GmbH, Linz (AT)

( * ) Notice: Subject to any disclaimer, the term of this patent is extended or adjusted under 35 U.S.C. 154(b) by 0 days.

(21) Appl. No.: 14/353,122

(22) PCT Filed: Sep. 5, 2012

(86) PCT No.: PCT/EP2012/067335
§ 371 (c)(1),
(2), (4) Date: Apr. 21, 2014

(87) PCT Pub. No.: WO2013/056892
PCT Pub. Date: Apr. 25, 2013

(65) Prior Publication Data
US 2014/0336813 A1    Nov. 13, 2014

(30) Foreign Application Priority Data

Oct. 21, 2011 (EP) .................................... 11186117

(51) Int. Cl.
*G05B 6/00*  (2006.01)
*B25J 9/16*  (2006.01)
*G05B 19/401*  (2006.01)

(52) U.S. Cl.
CPC ............. *B25J 9/1664* (2013.01); *G05B 19/401* (2013.01); *G05B 2219/37097* (2013.01); *G05B 2219/37425* (2013.01); *G05B 2219/37617* (2013.01); *G05B 2219/45054* (2013.01)

(58) Field of Classification Search
CPC ........ B25J 9/16; B25J 9/1664; G05B 19/401; G05B 19/4015

USPC .................. 700/213, 251, 302; 901/3, 46, 47; 73/1.79

See application file for complete search history.

(56) References Cited

U.S. PATENT DOCUMENTS

| | | | |
|---|---|---|---|
| 4,654,949 | A | 4/1987 | Pryor |
| 6,182,725 | B1 | 2/2001 | Sörvik |

(Continued)

FOREIGN PATENT DOCUMENTS

| | | |
|---|---|---|
| CN | 1337906 | 2/2002 |
| CN | 1396878 | 2/2003 |

(Continued)

OTHER PUBLICATIONS

English Language of International Search Report for PCT/EP2012/067335, mailed Nov. 13, 2012, 2 pages.

(Continued)

*Primary Examiner* — Mark Beauchaine
(74) *Attorney, Agent, or Firm* — Staas & Halsey LLP

(57) ABSTRACT

A method ascertains a tolerance location which differs from a target location for a pickup point for an object which is at rest in an installation and which is intended to be picked up by a means of transport. An identification mark is put onto the object in a known relative position in relation to the pickup point. A computation device uses a locating apparatus arranged in the installation to ascertain a physical location of the identification mark in the installation. The computation device ascertains the tolerance location from the physical location and the relative position. A corresponding apparatus contains a corresponding identification mark and a corresponding computation device.

20 Claims, 6 Drawing Sheets

(56) References Cited

U.S. PATENT DOCUMENTS

| | | |
|---|---|---|
| 6,652,698 B1 | 11/2003 | Tisserand et al. |
| 6,766,951 B2 | 7/2004 | von Bismarck et al. |
| 7,117,068 B2 * | 10/2006 | Critchlow .............. B25J 9/1692 235/383 |
| 2002/0136192 A1 | 9/2002 | Holma et al. |
| 2014/0336813 A1 | 11/2014 | Brett et al. |

FOREIGN PATENT DOCUMENTS

| | | |
|---|---|---|
| CN | 202088202 | 12/2011 |
| DE | 3302177 | 8/1983 |
| DE | 212009000055 | 2/2011 |
| EP | 1 186 117 | 3/2002 |
| EP | 0932115 | 10/2003 |
| EP | 1519372 | 3/2005 |
| EP | 11186117 | 10/2011 |
| EP | 2 584 418 A1 | 4/2013 |
| RU | 2208307 | 7/2003 |
| WO | WO 00/77947 A1 | 12/2000 |
| WO | PCT/EP2012/067335 | 9/2012 |

OTHER PUBLICATIONS

European Office Action for European Priority Patent Application No. 11186117.5, issued Mar. 14, 2012, 6 pages.

Search Report mailed Jan. 22, 2015 for corresponding Mexican Patent Application No. 2014004762, (2 pages).

Russian Office Action for related Russian Patent Application No. 2014120472/08(032700), issued Sep. 28, 2015, 13 pages.

Chinese Office Action for related Chinese Patent Application No. 201280050258.1, issued Oct. 28, 2015, 5 pages.

* cited by examiner

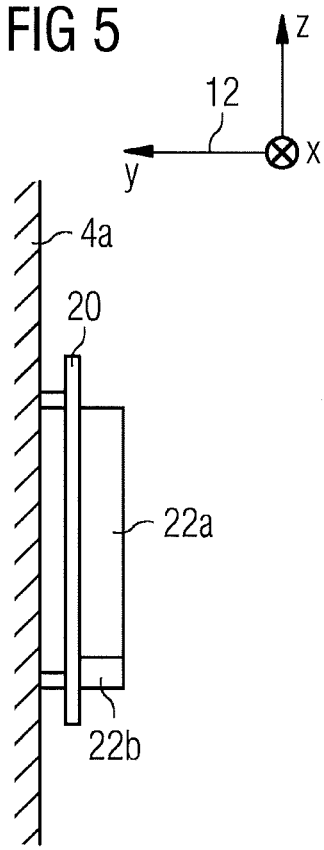
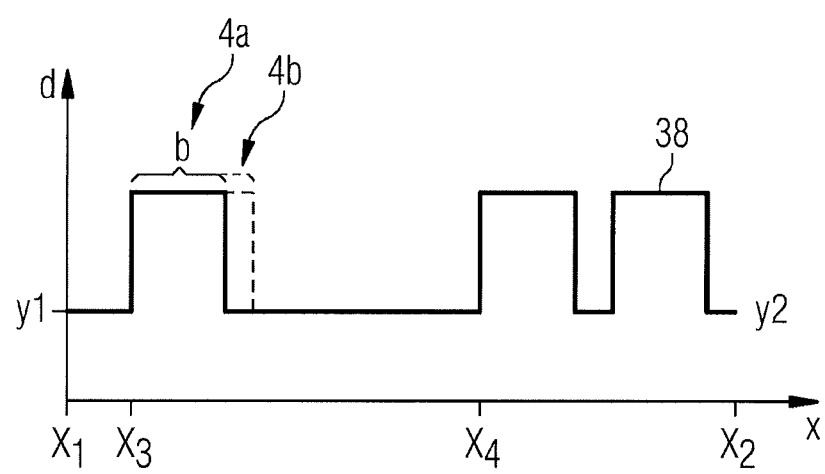

METHOD AND APPARATUS FOR LOCATING A PICKUP POINT FOR AN OBJECT IN AN INSTALLATION

CROSS REFERENCE TO RELATED APPLICATIONS

This application is based on and hereby claims priority to International Application No. PCT/EP2012/067335 filed on Sep. 5, 2012 and European Application No. 11186117.5 filed on Oct. 21, 2011, the contents of which are hereby incorporated by reference.

BACKGROUND

In technical installations the task often arises of an object at rest in the installation having to be picked up by a transport device. For this purpose the object has one—or as a rule also a number—of pickup points, at which the transport device can pick up the object. In particular if this pickup is to take place automatically the precise spatial location of the pickup point must be established.

An EAF (Electric Arc Furnace) installation is cited below as an example of an installation. The object is then a scrap basket able to be filled with steel scrap to be smelted, which is at rest for example on a scrap conveyor, e.g. a rail vehicle, or at another transfer point. The transport device is a charging crane. The pickup points are then transport eyes on the scrap basket into which the charging crane engages with corresponding transport hooks in order to lift the scrap basket and transport it.

The picking up of the scrap basket from a scrap conveyor or from another transfer point by the charging crane is a part of the charging process. It is known that this process can be carried out manually by a crane driver and without automation or measurement technology. This is done by remote control, i.e. by a remote control from the installation floor or by desk operation by the furnace attendant or as a mobile operation from a crane cabin. The operation is always undertaken within sight by the crane driver, e.g. by direct optical control or camera-based by observing a live video image. It is not necessary here to determine the position of the scrap basket or of its pickup point.

Automatic scrap charging into an electric arc furnace would now be desirable. The plan here is the automated charging basket pickup by the charging crane, the automated charging basket transport by the charging crane to the electric arc furnace, the automatic charging into the furnace vessel and also the automated transport of the charging basket back to the charging conveyor or to another transfer point. The discussion here deals merely with a subproblem of this field, namely the determination of the actual spatial position of the pickup point of the scrap basket. The spatial location determined can then for example be supplied to the control of the charging crane which can then move automatically to the corresponding position in order to pick up the scrap basket in a precisely targeted manner.

The object would be achievable for example by a 3D laser scan or a by live camera monitoring of the installation or by a combination of the two methods. Such a system would have to be installed in the installation in order for example to determine the actual position of the pickup point in a fixed coordinate system of the installation. Expensive hardware and measurements (3D laser scanner) or complex video evaluation with the expensive special hardware (camera image evaluation) are necessary for this purpose. Such a solution would therefore be complex and expensive.

EP 1519372 A2 discloses a system and a method for positioning a robot.

DE 212009000055 U1 describes a facility for improving handling devices such as multi-axis industrial robots.

DE 3302177 A1 describes a method and a device for automatic handling or processing or for automatic assembly of objects.

SUMMARY

The proposals are based on the following prerequisites: At or shortly before the point in time that the object is picked up by the transport device the object is at rest in the installation. A target location is predetermined in the installation for the object. E.g. a rail-guided conveyor carrying a scrap basket lies at a buffer of the rail system installed at a known position in a fixed location. The geometry of the conveyor and of the scrap basket is known and thus the location of the pickup points. Were the object to be located exactly in the target position, the spatial location of the pickup points in the installation would thus be directly known. However various circumstances mean that the object is in practice not precisely at the target location, but at a tolerance location deviating from said location within certain boundaries. E.g. if the scrap basket is raised by a few centimeters as a result of scrap lying below it and the scrap conveyor is displaced by a few centimeters along the rails. This actual tolerance position is to be determined here as exactly as possible.

One possible object is to specify an improved method and a device for determining the tolerance location of the pickup point of the object.

The inventors propose a method for determining a tolerance position of the pickup point of an object. The object is at rest in an installation and is to be picked up at the pickup point by a transport device. A known target location exists for the tolerance location. As a rule the tolerance location deviates from the target location.

In accordance with the proposals an identification mark is put onto the object. The relative position of the identification mark in relation to the pickup point—and as a rule also to the object per se—is known in this case. A computation device subsequently determines on the basis of a locating apparatus disposed in the installation a spatial position of the identification mark in the installation, i.e. in an installation coordinate system, at a fixed location in the installation. From the spatial location determined and the known relative location, the computation device subsequently determines the tolerance location, i.e. the actual local position of the pickup point in the installation or the installation coordinate system.

The actual tolerance location of the pickup point can subsequently for example be transferred to an automatic control of the transport device likewise oriented to the installation coordinate system, so that this can move suitably to the pickup point and can pick up the object at the pickup point with its pickup means at the most precise location possible.

Thus it is not the pickup point itself which is located directly by a locating apparatus, but the identification mark. Unlike the pickup point, which under some circumstances is difficult to locate, the identification mark can be designed in any given way. In particular locating apparatus and identification mark can be designed especially favorably as one system, in order to make location precise and easily possible. For example a cylindrical, metallic, often very dirty pickup eye of a scrap basket as pickup point is more difficult to locate by a locating apparatus than a clearly-defined, clean identification mark specifically designed for this purpose and tailored to the locating apparatus. Initially the method causes apparent extra effort, namely by the additional installation or the extra locating effort using the identification mark. However an advantage is obtained by the facility to locate the identification mark much more simply and exactly, since especially a significantly simpler and lower-cost locating apparatus can be used.

The locating apparatus measures at least one one-dimensional distance between itself and the identification mark. The computation device then establishes the spatial location of the identification mark on the basis of the at least one one-dimensional distance. Distance measurements are especially easy to undertake compared to for example digital image processing of a camera image. As a rule simple arithmetical operations according to the intercept theorem or the like are sufficient. Thus only a simple and relatively low-power computation device is necessary.

The locating apparatus makes use of a distance measurement, i.e. no other measurements are carried out apart from the distance measurements. In such cases a purely one-dimensional distance measurement is made from point to point. No 3D distance scan is thus performed here.

A pure point-to-point distance measurement does not result in any distance problems such as those arising with the said 3D scanner for example. The latter has an aperture angle of its scan cone and is only able to be used within narrow distance limits. An object at twice the distance to the first object can only be detected here as a rule with difficulty. With a pure distance measurement it is generally possible to measure multiple distances without difficulty easily and highly precisely.

In an especially preferred way the distance measurement for an object at rest on the floor of the installation can also be made in a direction in parallel to the floor of the installation, i.e. generally horizontally for example. In this way the distance measurement, for example, is not able to be disturbed by a crane generally operating from above as a transport device. An installation of the locating apparatus and the identification mark close to the floor means that simple maintenance of the installation is also possible.

In a further preferred embodiment of the method an identification mark provided with contours is used. The identification mark is thus not flat but has a height profile. The identification mark is attached to the object so that the contours, in each tolerance location, are able to be detected by the locating apparatus in the form of different measured distances at different measured points of the identification mark. In particular, for an object actually at rest in the target location, the contours are aligned in the direction of the distance to be measured. It is thus achieved that different areas of the identification mark exhibit the greatest possible differences relative to their respective distances to the locating apparatus. Distance measurements between the locating apparatus and different points of the identification mark thus lead to different distances or their greatest possible differences. Successive distance measurements at different points of the identification mark then produce a distance or height profile as the measurement result, i.e. a distance curve variable over time or location which can be evaluated by the computation device.

The spatial location of the identification marks is thus determined on the basis of a height-structured identification mark towards the locating apparatus. If the corresponding alignment is produced in the target location of the object at rest, then at least one such alignment is also produced in the tolerance locations, since these generally only deviate slightly from the target location. The principal alignment of the identification mark thus corresponds to the alignment in the target location. From the deviations produced, which are able to be detected using distance measurements however, just the exact tolerance location can then be detected.

In a further preferred embodiment of the method the locating apparatus contains a detection unit which serves for actual distance measurement and which is moved relative to the object at rest. The detection unit is therefore also moved relative to the identification mark at rest. The locating apparatus therefore determines a time or location-dependent distance profile or height profile when scanning the identification mark. The distance can always be measured in such cases in the same relative direction from the detection unit. The scanning of the identification mark is then produced solely from the movement of the detection unit. In particular a corresponding mobile distance measure is cheaper than an above-mentioned 3D scanner, which measures distances in different directions starting from a fixed location.

The locating apparatus, as well as the detection unit, then generally contains a chassis bearing said unit, which in its turn is installed at a fixed location in the installation. Despite the mobile detection unit the locating apparatus is still then only at a single location in the installation.

In an especially preferred variant of this embodiment the detection unit is moved along a straight line. If the distance is then measured, viewed from the detection unit, always in the same relative direction, e.g. at right angles to the straight line, the measuring point also especially passes over a line lying in one plane of the measuring devices on the identification mark.

In a preferred variant of this embodiment, and especially with an object at rest on the installation floor, the movement straight line of the detection unit can then run for its part in parallel to the floor, i.e. generally horizontally. In an especially preferred embodiment of the method the distance is measured in a direction at right angles to straight-line movements of the detection device. This direction then likewise runs horizontally for example. The advantages mentioned above apply here too.

In a preferred embodiment of the method an identification mark is used which has a level base surface, as a rule with structure elements forming contours emerging from the level surface. The identification mark is then attached to the object so that, for an object at rest in the target location, the base surface is aligned in parallel to the straight-line movements of the detection unit. If the detection unit is then moved along the straight line and if the distance is measured at right angles to the straight line, constant distance values are produced for measurement locations on the base surface of the identification mark. In particular, from different measured distances a tolerance location deviating from the target location is then produced at different locations of the base surface, e.g. a rotation of the identification mark and thus of the entire object in relation to the straight line. This can be determined especially easily.

In inventors also propose a device in which an identification mark able to be attached to an object in a known position relative to the pickup point, a spatial location of the identification mark located on the basis of a locating apparatus in the installation and a computing device determining the tolerance location from the spatial location and the relative position. The device has already been explained together with its advantages in conjunction with the aforementioned method.

The locating apparatus contains a distance measurement device as—at least part of the—detection unit which determines a one-dimensional distance between itself and the identification mark. The distance measurement device, in an especially preferred form of embodiment, is a laser distance measurement device. In particular the distance measurement device represents a part of the aforementioned detection unit.

It operates as a point-to-point measurement device and thus measures the distance along a linear measurement direction.

The identification mark can have the aforementioned contours, which are then able to be detected on the basis of the distance measurement.

In an especially preferred embodiment of the device the contours of the identification mark are then formed by a base surface and at least one structure element contoured in relation to said surface. The structure element is for example a square projecting from the base surface, which then forms corners at its edges. These are then reflected in a distance measurement as a jump in distance. E.g. a web sampled as a structure element during an ongoing distance measurement has two recognizable edges in the measured height profile as distance jumps.

The base surface of the identification mark is, as especially explained above, flat, at least in the area of the identification mark in which distance measurements are to be performed or expected for all permissible tolerance locations.

In an especially preferred embodiment of the device at least one area of the identification mark has contours which are constant in relation to different tolerance locations and in relation to the distances to be measured. In other words the corresponding area of the identification mark is designed so that equal height or distance profiles will be measured in each case for different tolerance locations. Such contours are used for example to identify an object type which is to be detected as the same in each case independently of the tolerance location. Thus for example in a height profile determined for different tolerance locations, the same or similar characteristics occur in the corresponding profiles. The structure elements are in other words selected as a function of an object type. The differences are able to be detected here by the locating apparatus independently of the tolerance locations. For example different object types can be distinguished in this way, which have different known relative locations of the identification marks relative to the pickup points.

Such measurement profiles can also serve as reference profiles in order to calibrate the locating apparatus for the respective measurement.

As an alternative or in addition an area of the identification mark has contours different in relation to various tolerance locations. It is not the identification mark itself or its actual height structure which is designed variably here but the height structure is designed such that different height profiles in the direction of the distance to be measured are produced. In other words the identification mark is then embodied such that modified height profiles are measured for different tolerance locations. The measured height profiles are thus dependent on the tolerance location. This means that a determination of the tolerance location from the distance measurement is uniquely possible. E.g. for different tolerance locations the identification mark is scanned by the distance measuring device at different line courses. The contours are then different in each case in the area of the line courses.

In an especially preferred embodiment the computation device is a programmable logic control. In an especially preferred manner it is a part of the installation controller present in any event. Compared to an image evaluation of a camera image, the aforementioned distance measurements are mathematically simple operations which can easily be executed by a programmable logic control (PLC). The expense of additional more powerful hardware in the installation is thus saved. The automatic position detection of the pickup point can also be handled in a simple and low-cost manner by the existing installation controller.

An identification mark is thus used together with the locating apparatus as an encoding system for determining the tolerance location. Especially on the basis of a two-dimensional measurement (point-to-point measurement at different locations) and the simplest mathematical operations the determination of the space coordinates of the object and of any rotation and of the object type is possible. The locating apparatus can be embodied as a simple apparatus, e.g. a laser distance measuring device driven by a linear drive which detects the encoding on the object. A simple PLC evaluation is possible.

The method and device make possible both the inclusion of automatic object pickup in a fully-automated installation, e.g. a fully-automated steelworks; also a rapid and safe picking up of the object by the transport device, as well as a saving in operating costs, especially the saving of a person for operating the transport device. The picking up of the object by the transport device is based on a measured value and mathematics, without human intervention, and is therefore reproducible.

The method and the device can be used for a very wide variety of installations and objects to be picked up. The option of evaluation in a simple PLC saves on coordination with outside companies as well as procurement of a PC unit with software and its inclusion in a network. The described device and method are lower-cost for example than the aforementioned systems with video camera, laser scanner or combinations thereof.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 5 shows the identification mark from FIG. 4 in another side view,

FIG. 7 shows a height profile measured at the identification mark.

DETAILED DESCRIPTION OF THE PREFERRED EMBODIMENT

Figure 1:
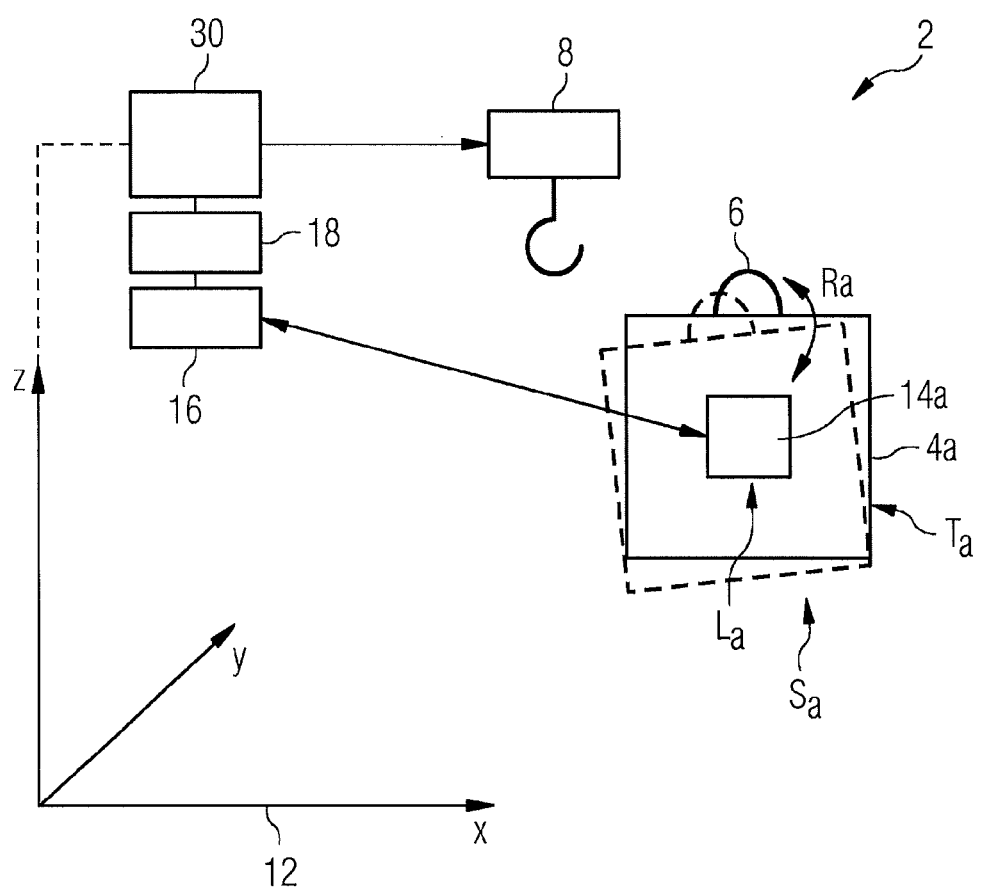
FIG. 1 shows an overview of the method.

Reference will now be made in detail to the preferred embodiments of the present invention, examples of which are illustrated in the accompanying drawings, wherein like reference numerals refer to like elements throughout.

FIG. 1 symbolically shows an installation 2 with an object 4a, having a pickup point 6. It is to be picked up at this point by a transport device 8. A fixed installation coordinate system 12 exists in the installation 2. The object 4a and thereby its pickup point should ideally be in a target location Sa. Actually however it is in a tolerance location Ta—generally deviating from said target location. So that the transport device 8 can move exactly to the pickup point 6 in accordance with a control unit 30 orienting itself to the installation coordinate system 12, the tolerance location Ta must be determined exactly.

An identification mark 14a is attached to the object, which is thus located in a known relative position R to the pickup point 6. A computation device 18 connected to the control unit 30 communicates with a locating apparatus 16. On the basis of this it determines a spatial location La of the identification mark 14a in the installation coordinate system 12 and thus in the installation 2. On the basis of the spatial location La and the relative location R, it then determines the tolerance location Ta of the pickup point 6 and as a rule also of the entire object 4a. It is also conceivable as an alternative to know the relative location R between identification mark 14a and object 4a and initially to determine the tolerance location of the object 4a itself, and from this the tolerance location of the pickup point 6 located on the object 4a in a relative position that is once again known.

Figure 2:
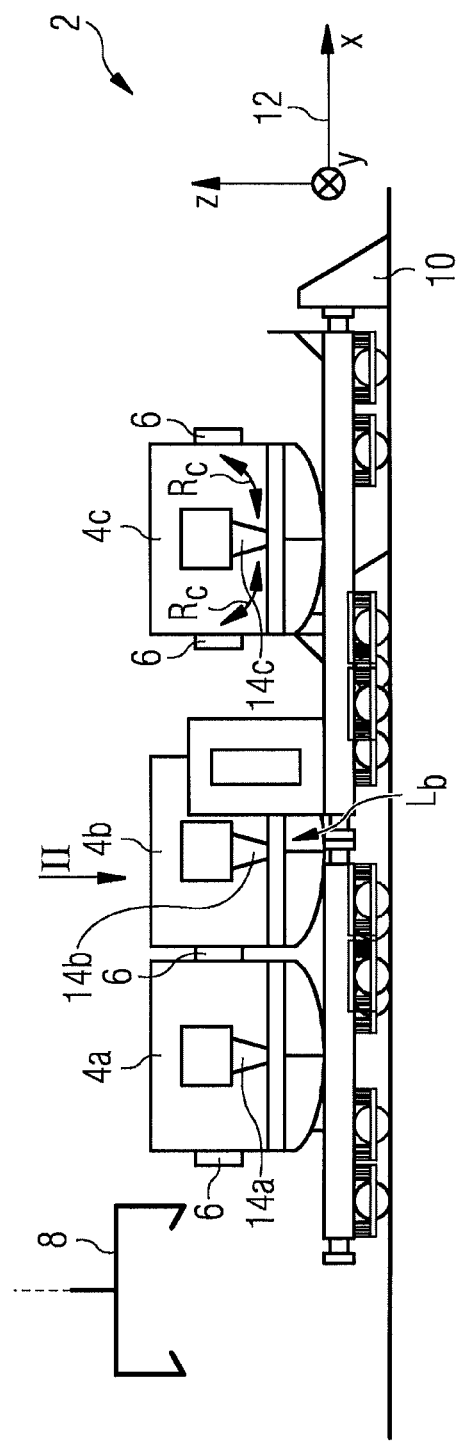
FIG. 2 shows an installation in a side view.
Figure 3:
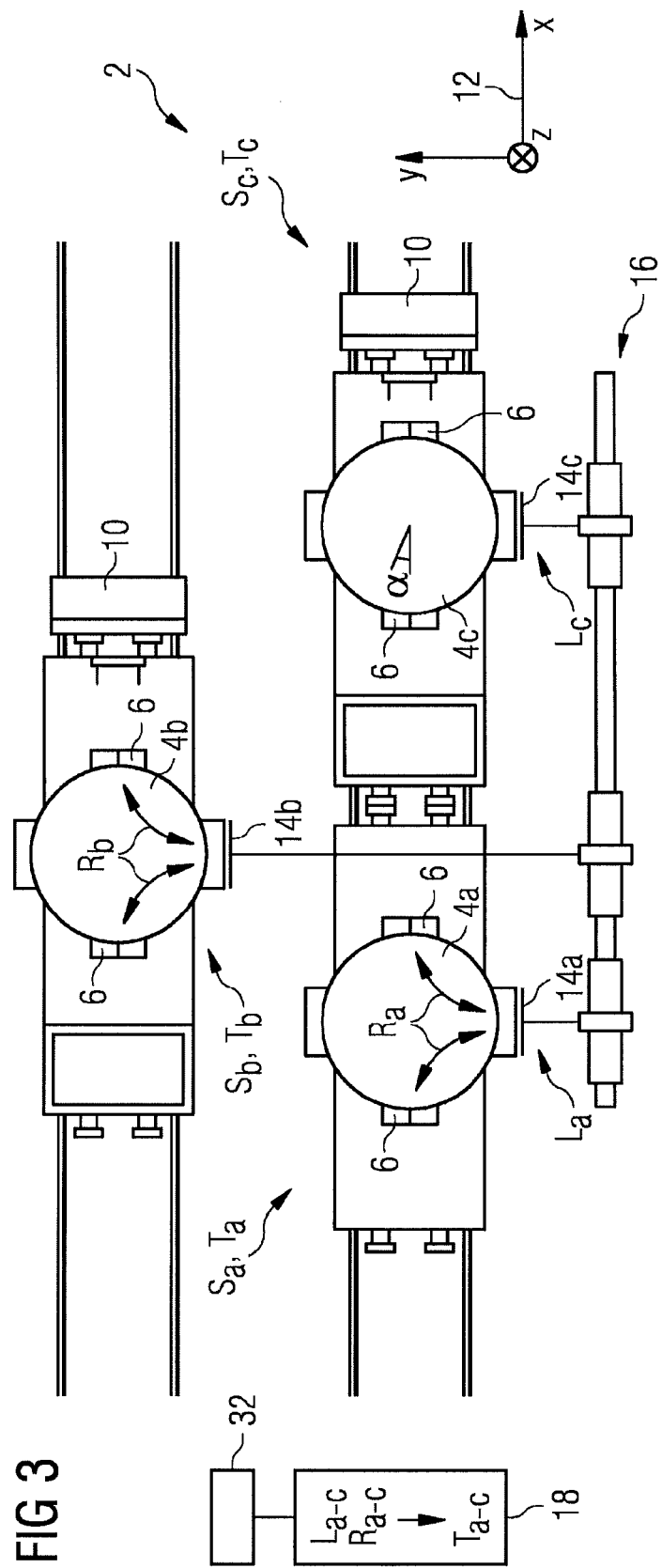
FIG. 3 shows the installation from FIG. 2 viewed from above.

FIG. 2 shows a realistic section of an installation 2, in the example an EAF installation with three objects 4a-c, in the example scrap baskets. Each of the objects 4a-c has respective pickup points 6, at which said objects are to be picked up by the transport device 8, here a charging crane. FIG. 2 shows a side view of the situation, FIG. 3 shows a view from above in the direction of the arrow II.

The objects 4a-c are stored here on rail-guided transport or scrap conveyors not explained in any greater detail, which are moved up to respective stop buffers 10. The objects 4a-c thus come to rest at in least approximately defined tolerance locations Ta-c, i.e. with sufficient tolerance in so-called transfer locations. These however differ as a rule from the ideal target locations Sa-c to be assumed.

In the example the objects 4a-c are located in the x-direction and in the y-direction with an accuracy of ±6 cm and also in the z-direction with a deviation of 0 to +15 cm in the target locations Sa-c. In particular the tolerance in the z-direction is a result of possible dirt and pieces of scrap between the scrap baskets and the support surface of the conveyors. The objects 4a-c are also in some cases slightly rotated by a tolerance angle α of the few degrees around this z-axis. The tolerances in the x- and y-direction are based on the buffers 10 and the rail guidance as well as the position or support of the object 4a-c on the scrap conveyor. An identification mark 14a-c is applied to each object 4a-c. Its respective relative positions $R_{a-c}$ to the associated object 4a-c or to the pickup points 6 are known.

The installation 2 also contains the locating device 16 for determining the respective spatial locations $L_{a-c}$ of the identification marks 14a-c in the installation coordinate system 12 with the aid of the computation device 18, here in the form of a PLC. The computation device 18 then determines from the respective spatial locations $L_{a-c}$ and the known relative positions $R_{a-c}$ the respective tolerance locations $T_{a-c}$ of the pickup points 6 in the installation coordinate system 12.

Figure 4:
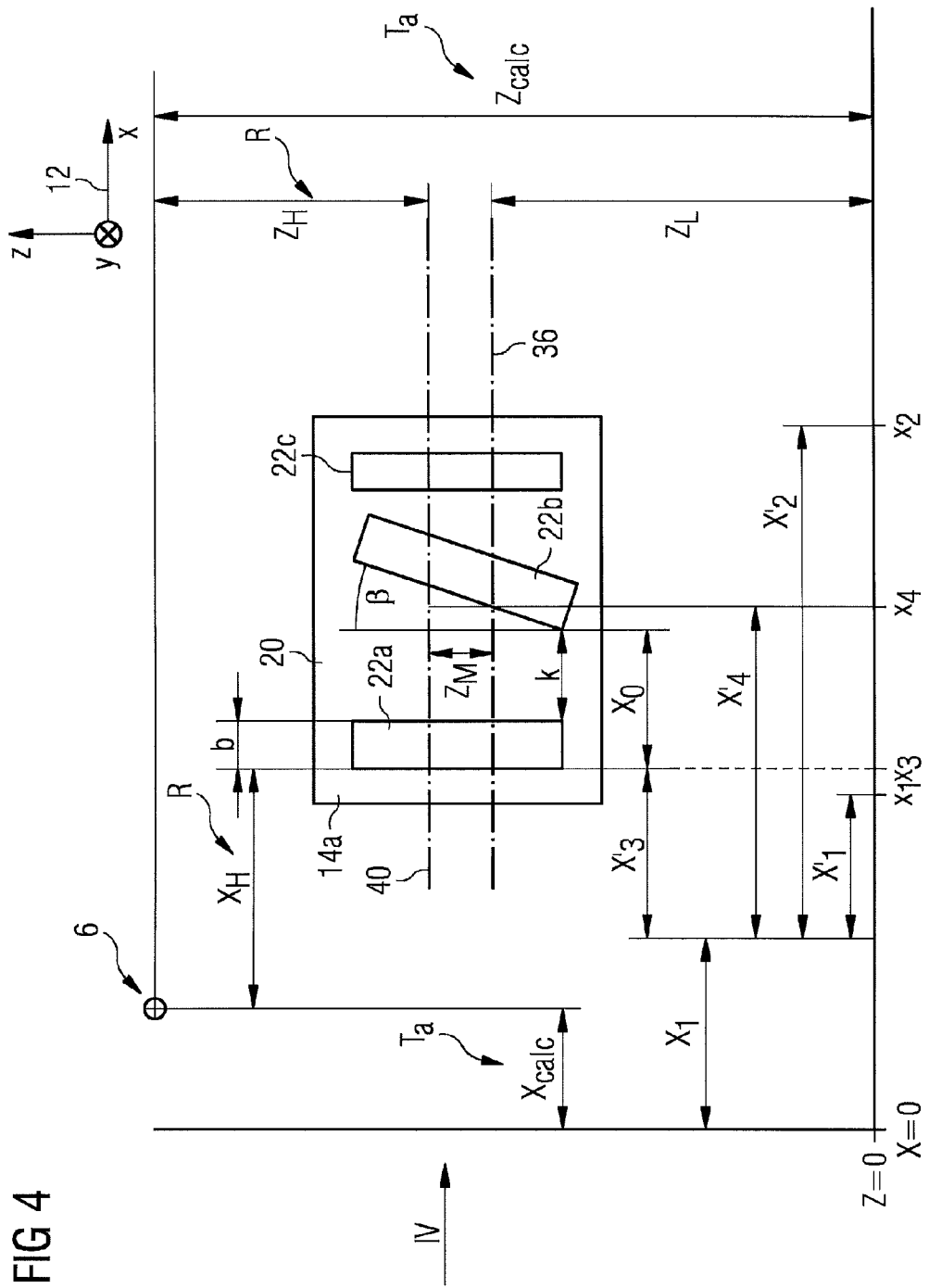
FIG. 4 shows an identification mark in a side view.
Figure 6:
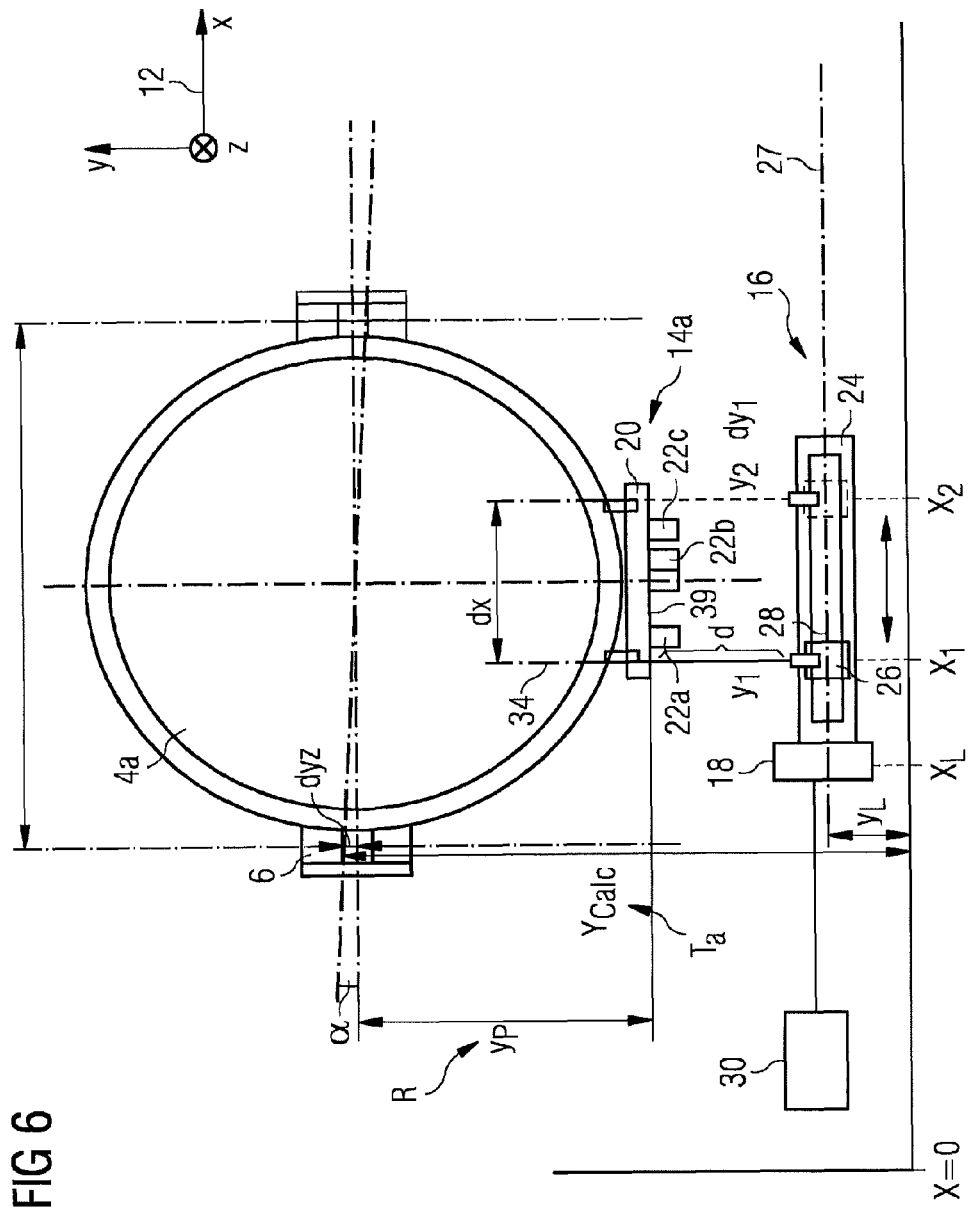
FIG. 6 shows the identification mark from FIG. 4 in the installation in a view from above.

FIG. 4 shows the identification mark 14a in detail in a side view in the direction of the y-axis. FIG. 5 shows the side view of the identification mark 14a in the direction of the arrow IV, i.e. in the x-direction, and how this is attached to the object 4a. FIG. 6 shows in a view in accordance with FIG. 2 in the z-direction the object 4a with the identification mark 14a and the locating apparatus 16 in detail.

In the example the identification mark 14a has an iron plate, here a base plate forming a flat base surface 20, with parallel raised structure elements $22_{a-c}$ in the form of webs mounted thereon, which project from the base surface 20 and form corresponding side edges standing at right angles to the base surface 20.

The locating apparatus 16 has a chassis 24 extending in the x-direction, on which a detection unit 26 is able to be moved in the x-direction in a straight line 27. The detection unit 26 is a laser distance measurement device in the example. The movement of the detection unit 26 is effected by a linear drive 28. The entire locating apparatus 16 is serviced via a control unit 30 and the computing device 18, shown symbolically as a part of the installation control (PLC).

The locating apparatus 16 or the detection unit 26 here always determines a distance d between itself and an opposing point, which in FIG. 5 always moves along the identification mark 14a. The distance is measured in a direction 34 which always runs at right angles to straight line 27, i.e. the direction of movement here thus runs in the y-direction.

As soon as the scrap conveyor concerned with the object 4a that it is carrying in FIG. 1 or 2 assumes its tolerance location $T_a$ in an at rest state, the locating apparatus 16 begins its measurement of distances d by the detection unit 26. From the extended position x1 shown in in FIG. 6 the detection unit 26 will be moved here in the direction of the positive x-axis up to the position x2 shown as a dashed outline.

The distance covered here is $d_x = X_2 - X_1$. The corresponding X-positions relate here to the X=0 zero location of the installation coordinate system 12. The location of the fixed basic framework 24 is known as xL. The variables x1 and x2 are produced as offsets x1' and x2' of the detection unit and 26 to the chassis 24, added to xL.

A measuring point of the distance measurement scans here along a measurement line 36 over the identification mark 14a. FIG. 7 shows the course of the measured distances d plotted via the x-coordinates, namely a measured height profile 38. The height profile 38 is adjusted here by filtering after the measurement. The height profile 38 maps the contours 39 of the identification mark 4a detected with the distance measurement. By evaluation of the height profile 38 the control unit 30 determines the tolerance location $T_a$—here an x,y,z spatial location as well as an angle of rotation α around the z-axis—of the identification mark 14a or of the object 4a. Via the known relative position $R_a$ to the identification mark 14a or to the object 4a then finally the actual tolerance location $T_a$ of the pickup points 6 of the object 4a, here too again their x,y,z spatial location and the angle of rotation α around the z-axis.

The y-location YL of the straight line 27 and thus of the detection unit 26 and of the measurement line 36 as a distance to the zero point Y=0 are also known in detail. From the measured distances d at the X-coordinates $X_1$ and $X_2$ the respective actual Y-coordinates $Y_1$ and $Y_2$ of the base surface 20 are produced by addition of the distances d and the variable YL as the location of the measuring line 36. Since in the present case the object 4a is rotated by an angle α, a difference $dY1 = Y_1 - Y_2$ is produced. Via the known dimensions of the object 4a (diameter, location of the pickup points 6) in the installation 2 the angle α, as well as the resulting deviations of the x-y coordinates of the pickup points 6 in the tolerance location $T_a$, can be computed in this way. For example the constant Y distance $Y_P$ between the identification mark 14a and the pickup point 6 is known here as a part of the known relative location R. From the variables determined in the interim and the known dimensions of the object 4a the actual position $Y_{calc}$ of the pickup point 6 is able to be determined, which thus forms a part of the tolerance location $T_a$. The calculation of $Y_{calc}$ also includes for example the deviation $d_{y2}$, which is produced in the angle α or from $d_{y1}$ and the beam set.

In the measured height profile 38 the values $X_3$ and $X_4$ are produced—the location of the distance jumps—as the respective zero coordinates $X_L$ of the locating apparatus 16 together with the respective current offsets $X'_3$ and $X'_4$ of the detection unit 26 to the zero point $X_L$. The jump in the height profile 38 at point $X_3$ is caused by the structure element 22a. Its location $X_H$ is again known as a part of the relative position $R_a$ in relation to the pickup point 6 (only shown symbolically in FIG. 3). Thus the x location $X_{calc}$ of the tolerance location $T_a$ is able to be calculated.

If the object 4a were to be located in its target location $S_a$, the laser point of the detection unit 26 would scan the identification mark 14a at the height of the zero level 40 i.e. a measuring line 36 would be produced there. Because of the actual height offset of the object 4a in the +Z direction on the other hand the laser point scans the identification mark 14a at the height of the actual measurement line 36. Since the structure element 22b is tilted around the Y-axis by an angle β in relation to the structure element 22a, the height offset $Z_M$ of the measurement line 36 to the zero level 40 can be determined from the actual distance or X4-X3 and the angle β. The corresponding angle calculations can be made from the known distance K of the two structure elements 22a and 22b and the opening angle β.

The web distance between the structure elements 22a,b is thus, on account of their tilting, dependent on the z-component of the tolerance location $T_a$. This area of the identification mark thus forms different contours in relation to different tolerance locations $T_a$ in the direction of the distance d to be measured.

Together with the relative location $Z_H$ known in its turn between the zero level 40 and the pickup point 6 as part of the known relative location $R_a$ and the known height location $Z_L$ of the laser beam of the detection unit 26 in the coordinate system 12, the Z-location $Z_{calc}$ of the tolerance location $T_a$ can thus also be established in this way.

The web width b can vary here between different objects 4a,b (indicated in FIG. 7), in order to distinguish these from one another on the basis of the measured value b in the height profile 38. As an alternative or in addition a distinction can be made between the objects 4a,b on the basis of further additional webs, such as the structure element 22c for example or its omission.

The web width b or the distance between the parallel structure elements in 22a,c is largely independent of all alignments of the identification mark 14a in permissible tolerance locations $T_a$. This area of the identification mark therefore forms constant contours in relation to different tolerance locations $T_a$ in the direction of the distance d to be measured and can thus be used for tolerance-location-independent detection of the object type.

That a scrap conveyor is present at all can for example likewise be detected from the height profile 38. If the remaining structure of the scrap conveyor in the relevant area which is able to be detected by the locating apparatus 16 by distance measurements does not have any flat surfaces of the size of the identification marks 14a-c. Only with the presence of a conveyor or identification mark is then a height profile with an approximately flat base line mapping the base surface 20 and scattered jumps in height produced at all.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV,* 69 USPQ2d 1865 (Fed. Cir. 2004).

The invention claimed is:

1. A method for determining a tolerance location deviating from a target location of a pickup point of an object at rest in an installation to be picked up by a transport device, in which:

an identification mark is put onto the object in a known relative position to the pickup point, a calculation device establishes on the basis of a locating apparatus disposed in the installation a spatial location of the identification mark in the installation, the calculation device establishes the tolerance location from the spatial location and the relative position, the locating apparatus measures at least one one-dimensional distance between itself and the identification mark, and the computation device establishes the spatial location on the basis of the at least one one-dimensional distance.

2. The method as claimed in claim 1,
in which the identification mark is provided with contours, and
in which the identification mark is put onto the object such that the contours, if the object were at rest in the target location, would be aligned in the direction of the distance to be measured.

3. The method as claimed in claim 2,
in which a detection unit contained in the locating apparatus, measuring the distance is moved relative to the object at rest.

4. The method as claimed in claim 3,
in which the detection unit is moved along a straight line.

5. The method as claimed in claim 4,
in which the distance is measured in a direction at right angles to the straight line.

6. The method as claimed in claim 4,
in which an identification mark having a flat base surface is attached to the object so that, for an object at rest in the target position, the base surface is aligned in parallel to the straight line.

7. The method as claimed in claim 6,
in which the distance is measured in a direction at right angles to the straight line.

8. The method as claimed in claim 1,
in which a detection unit contained in the locating apparatus, measuring the distance is moved relative to the object at rest.

9. The method as claimed in claim 8,
in which the detection unit is moved along a straight line.

10. The method as claimed in claim 9,
in which the distance is measured in a direction at right angles to the straight line.

11. The method as claimed in claim 9,
in which an identification mark having a flat base surface is attached to the object so that, for an object at rest in the target position, the base surface is aligned in parallel to the straight line.

12. The method as claimed in claim 11,
in which the distance is measured in a direction at right angles to the straight line.

13. A device for determining a tolerance location deviating from a target location of a pickup point of an object at rest in an installation to be picked up by a transport device, with:

an identification mark able to be attached in a known relative position to the pickup point on the object, a calculation device establishing on the basis of a locating apparatus disposed in the installation a spatial location of the identification mark in the installation and establishing the tolerance location from the spatial location and the relative position, the locating apparatus contains a distance measurement device establishing a one-dimensional distance between itself and the identification mark as at least part of the detection unit.

14. The device as claimed in 13,
in which the calculation device is a programmable logic control.
15. The device as claimed in claim 13,
in which the identification mark, for an object at rest in the target location, has contours aligned in the direction of the distance to be measured.
16. The device as claimed in 15,
in which the at least one area of the identification mark has different contours in relation to different tolerance locations in the direction of the distance to be measured.
17. The device as claimed in 15,
in which the at least one area of the identification mark has constant contours in relation to different tolerance locations in the direction of the distance to be measured.
18. The device as claimed in 17,
in which the at least one area of the identification mark has different contours in relation to different tolerance locations in the direction of the distance to be measured.
19. The device as claimed in claim 15,
in which the contours are formed by a base surface and at least one structure element contoured in relation to said surface.
20. The device as claimed in 19,
in which the at least one area of the identification mark has different contours in relation to different tolerance locations in the direction of the distance to be measured.

* * * * *